(12) United States Patent
Albertz

(10) Patent No.: US 10,506,768 B2
(45) Date of Patent: Dec. 17, 2019

(54) DEVICE AND METHOD FOR REMOVING LEAVES FROM A PLANT

(71) Applicant: Jeannette Wilhelmina Albertz, Brunssum (NL)

(72) Inventor: Jeannette Wilhelmina Albertz, Brunssum (NL)

( * ) Notice: Subject to any disclaimer, the term of this patent is extended or adjusted under 35 U.S.C. 154(b) by 0 days.

(21) Appl. No.: 16/083,589

(22) PCT Filed: Mar. 13, 2017

(86) PCT No.: PCT/NL2017/050158
§ 371 (c)(1),
(2) Date: Sep. 10, 2018

(87) PCT Pub. No.: WO2017/155411
PCT Pub. Date: Sep. 14, 2017

(65) Prior Publication Data
US 2019/0075733 A1  Mar. 14, 2019

(30) Foreign Application Priority Data

Mar. 11, 2016  (NL) ...................... 2016425

(51) Int. Cl.
| *A01G 17/02* | (2006.01) |
| *A01D 46/00* | (2006.01) |
| *A23N 15/00* | (2006.01) |
| *A01G 3/08* | (2006.01) |

(52) U.S. Cl.
CPC ......... *A01G 17/026* (2013.01); *A01D 46/005* (2013.01); *A01G 3/08* (2013.01); *A23N 15/00* (2013.01)

(58) Field of Classification Search
CPC .... A01D 46/005; A01D 46/04; A01D 46/285; A01G 17/026; A23N 15/00; A23N 15/02
USPC .................................. 460/134–136, 142–143
See application file for complete search history.

(56) References Cited

U.S. PATENT DOCUMENTS

| 6,834,487 B2 * | 12/2004 | Pellenc | ............... | A01G 17/026 |
| | | | | 56/330 |
| 7,168,643 B2 * | 1/2007 | Mercier | ............... | A01D 46/005 |
| | | | | 241/169.1 |
| 7,305,812 B2 * | 12/2007 | Schloesser | ........... | A01G 17/026 |
| | | | | 56/230 |

(Continued)

FOREIGN PATENT DOCUMENTS

| CA | 2250592 A1 | 4/2000 |
| CA | 2254469 A1 | 5/2000 |
| EP | 2687082 A1 | 1/2014 |

(Continued)

OTHER PUBLICATIONS

International Preliminary Report on Patentability from PCT/NL2017/050158 dated Sep. 20, 2018, 6 pages.

(Continued)

*Primary Examiner* — Alicia Torres

(57) ABSTRACT

A device and method for removing leaves from a plant includes a downward extending and elongate support surface for supporting the plant and a pair of cutting devices disposed on either side of the support surface. Each cutting device includes a rotatable blade assembly and a grating which is disposed between the blade assembly and the support surface.

20 Claims, 4 Drawing Sheets

(56) References Cited

U.S. PATENT DOCUMENTS

2005/0081501 A1     4/2005   Pellenc
2007/0271896 A1*   11/2007   Bonny ................. A01G 17/026
                                                                                                   56/121.4

FOREIGN PATENT DOCUMENTS

| GB | 1126910 A * | 9/1968 | ............ A23N 15/02 |
| GB | 2223658 A | 4/1990 | |
| NL | 9002390 A | 6/1992 | |
| WO | 2002091863 A1 | 11/2002 | |
| WO | 2005051108 A1 | 6/2005 | |

OTHER PUBLICATIONS

PCT International Search Report and Written Opinion from PCT/NL2017/050158 dated Jul. 11, 2017, 12 pages.

* cited by examiner

DEVICE AND METHOD FOR REMOVING LEAVES FROM A PLANT

This is a national stage application filed under 35 U.S.C. § 371 of pending international application PCT/NL2017/050158, filed Mar. 13, 2017, which claims priority to Netherlands Patent application NL 2016425, filed Mar. 11, 2016, the entirety of which applications are incorporated by reference herein.

The present invention relates to a device and method for removing leaves from a plant.

It is known that many plants can have a medicinal or other type of effect. This effect is usually due to one or more active constituents of the plant. A problem occurring here is that the active constituents are in most cases present either in the stem and/or root of a plant or in the flower or fruit, or that these constituents can be found only in the leaves. As a result, the leaves have to be separated from the rest of the plant for an efficient extraction of the active constituents.

A device which is suitable for removing leaves from a plant is known from the prior art. This known device comprises a table or other type of horizontal support on which a cutting device is placed. The cutting device comprises a housing in which a rotatable blade assembly is disposed and a grating which closes the housing on an upper side. The plant is placed on or in the vicinity of the grating for the purpose of removing the leaves. The leaves, which protrude at least partially through the grating, will here be cut or pulled from the remaining part of the plant. In some embodiments of the known device a cover is placed on the grating, which creates a space in which the plant can be confined. The plant, or parts thereof, can also be set into motion by mechanical means or an airflow, such that a different part of the plant is in each case in contact with the grating.

A drawback of the known device is that for the purpose of removing the leaves from a relatively large plant, the plant must first be cut into pieces in order to enable placing in the space above the grating. A further drawback of the known device is the low throughput speed. Only a small quantity of plants can hereby be processed per unit of time.

The invention has for its object to provide a solution for at least one of the above stated problems. According to a first aspect, this object is achieved with a device for removing leaves from a plant as defined in claim 1. According to a second aspect, this object is achieved with a method for removing leaves from a plant as defined in claim 16.

The device according to the invention comprises a downward extending and elongate support surface for supporting the plant and a pair of cutting devices disposed on either side of the support surface, wherein each cutting device comprises a rotatable blade assembly and a grating which is disposed between the blade assembly and the support surface. The device further comprises a frame on which are mounted the pair of cutting devices and optionally the support surface, wherein the frame is configured to be placed on a ground surface. Each cutting device is configured here to cut and/or to pull the leaves of the plant which protrude at least partially through the grating from the remaining part of the plant.

Because of the downward arrangement of the support surface, a plant placed thereon will sag or slump less than a horizontally placed plant. When the support surface is placed horizontally, the leaves will come to lie close together due to their own weight. A result hereof is that leaves will protrude less easily through the grating and that the overall processing time per plant will increase. The downward arrangement of the support surface reduces this problem since the component of the force of gravity perpendicularly of the support surface will be smaller than in the case of a purely horizontal placing.

A further advantage of using a support surface instead of a space between cover and grating is the option of using a second cutting device. This will further increase the throughput speed of the device.

It is preferred that a first angle between the support surface and the ground surface can be adjusted between 0 degrees and 90 degrees, particularly between 10 degrees and 70 degrees and more particularly between 20 and 50 degrees. It will be apparent to the skilled person that the optimal choice of the first angle is determined by the type of plant and the height of such a plant. This is because the slumping of the plant as discussed above occurs more commonly when the leaves are heavy. Such leaves are usually found in relatively large and tall plants. This may make it impossible or impractical to realize a fully vertical placing of the support surface relative to the ground surface, i.e. a first angle of 90 degrees. By choosing a smaller angle a compromise can be found between throughput speed on the one hand and convenience of use on the other.

For the purpose of setting the first angle the support surface can be mounted on the frame in adjustable manner. Adjustment, preferably continuously variable adjustment, of the support surface enables a desired first angle to be chosen. Instead of or in addition to this, the frame can be provided on at least one side thereof with adjusting elements with which the distance between the ground surface and a remaining part of the frame can be adjusted. An example hereof are adjusting screws, the height of which can be set by turning the adjusting screws.

It is also possible for the support surface to be attached to one or both gratings. The support surface more particularly extends in a longitudinal direction and the gratings are attached parallel to this longitudinal direction. In an example the support surface rests on a transverse connection of the grating. The support surface can however also be connected to the grating at one or more points. The grating being embodied for rotation around a rotation axis which is perpendicular to the grating creates the option of changing the height of the point where the support surface is connected to the grating by means of rotating the grating. The angle of the support surface can also be adjusted in this manner.

Different plants have different dimensions. A plant can thus be tall and thin, or relatively short and wide. In order to remove leaves in optimal manner for different dimensions, the cutting devices can be mounted on the frame in adjustable manner such that a second angle between a grating of one of the cutting devices and the support surface can be set. The second angle is preferably adjustable here between 10 degrees and 170 degrees, and more preferably between 60 degrees and 120 degrees.

The frame can comprise a support frame or table and a plurality of uprights which are connected to the support frame or the table. The device can here further comprise a pair of cutting device supports which are fixedly connected to the support frame or the table, wherein each cutting device is pivotally coupled by at least one hinge to a respective cutting device support for the purpose of setting the second angle. It can be the case for each cutting device that one of the cutting device support and the cutting device comprises a slot at a distance from the at least one hinge, and that the other of the cutting device support and the cutting device comprises a pin which protrudes through the slot. The device can here further comprise for each cutting device a locking element for locking the pin relative to the slot for the purpose of fixing the second angle.

As an alternative to the above stated embodiment, for the purpose of realizing the adjustment of the second angle the frame can comprise a girder extending substantially parallel to the ground surface and a pair of uprights rotatably connected to the girder, which uprights are each fixedly connected to a different cutting device. The frame can further comprise a pair of said girders which are disposed in parallel and at a mutual distance, wherein the frame further comprises a plurality of transverse connections between the pair of girders which are placed at a mutual distance. Each cutting device, and/or the upright connected thereto, is rotatably connected here to an adjusting arm, which adjusting arm can in each case engage at an end remote from the cutting device one of the plurality of transverse connections for the purpose of realizing a setting of the second angle.

An additional or alternative measure for modifying the device subject to the size and/or width of the plant is achieved when a distance between the cutting devices can be adjusted in a direction substantially perpendicularly of the support surface. This can for instance be achieved in that the frame comprises guides which extend in a direction substantially perpendicularly of the support surface and in which at least one cutting device is slidably received.

Each cutting device preferably comprises a housing in which the blade assembly is rotatably disposed, a motor for rotating the blade assembly and a discharge for discharging leaves, which have been pulled and/or cut off, from the housing and to the outside. The device according to present invention can further comprise a control circuit for controlling the motors of the cutting devices, wherein the control circuit is configured to control the blade assemblies of the pair of cutting devices such that they have opposite rotation directions as seen from the support surface. The airflows coming from the two cutting devices will hereby provide for a turbulent flow at the position of the leaves. As a result of this airflow, the leaves will be able to come into contact with the grating and the blade assembly placed therebehind more easily.

According to the second aspect of the invention, a method is provided for removing leaves from a plant. The method comprises here the steps of providing a device for removing leaves from a plant as described above. The method further comprises of the user taking hold of the plant at an underside thereof, such as the bottom of a stem of the plant and/or the roots of the plant, and placing the plant on the support surface with a top of the plant directed downward. The leaves can be removed by moving the plant along the cutting devices.

It is preferred for the user to stand at the end of the support surface which is placed at a higher position. This enables the user to easily place the plant on the support surface with the top directed downward.

Moving the plant along the cutting devices preferably comprises of pulling the plant toward the user. The user can here simultaneously rotate the plant. In addition to or instead of this, moving the plant along the cutting devices can comprise of moving the plant upward and downward in a longitudinal direction of the support surface.

It is preferred to place the plant on the support surface prior to removal of the leaves such that the cutting devices are situated between the user and a majority of the leaves of the plant. The plant generally comprises on the underside thereof a part, such as the bottom of the stem or the roots, to which no or hardly any leaves are connected. The user can grip the plant by this part and place the remaining part of the plant on the support surface.

The invention will be discussed in more detail hereinbelow with reference to the accompanying figures, wherein.

Figure 1:
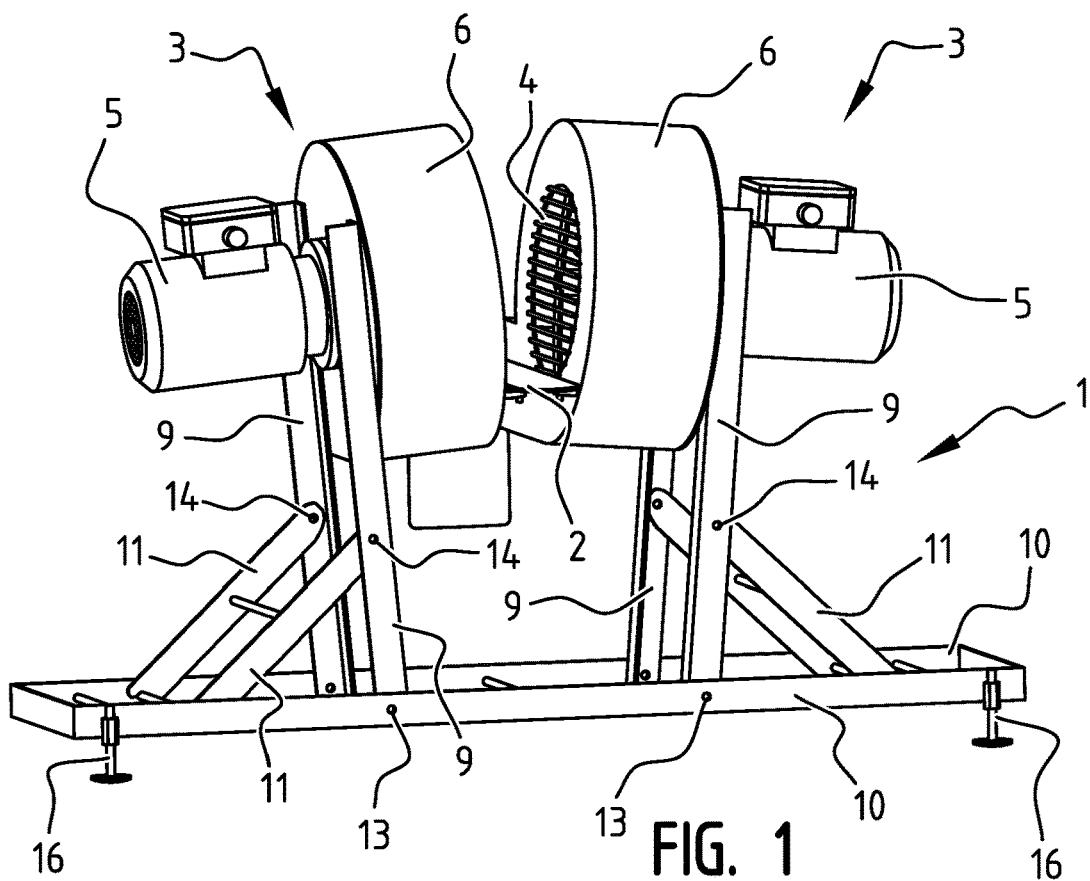
FIG. 1 shows a rear view of an embodiment of the invention.
Figure 2:
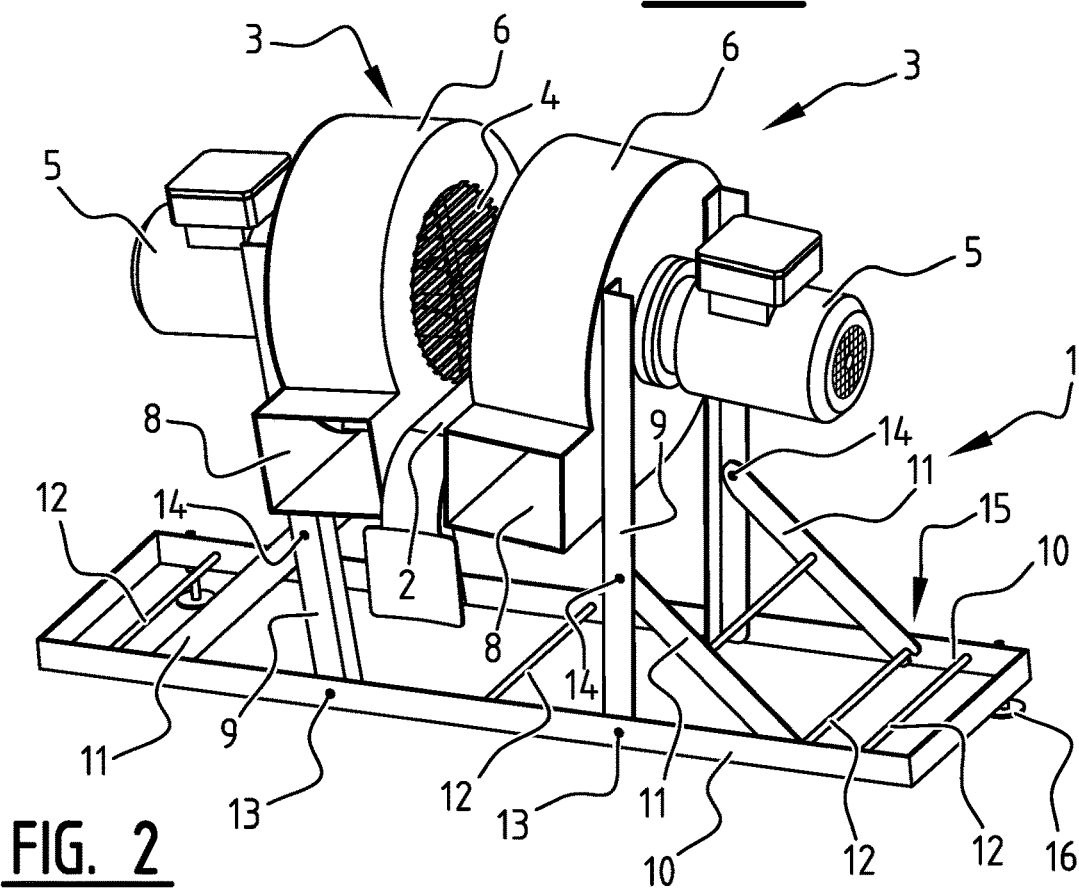
FIG. 2 shows a front view of the embodiment of FIG. 1.

FIGS. 1 and 2 show respectively a rear and front view of an embodiment of the present invention. This embodiment comprises a frame 1 on which a support surface 2 is mounted. Support surface 2 is formed by one or more metal plate parts. Cutting devices 3 are disposed on either side of support surface 2. Each cutting device 3 comprises a housing 6, a blade assembly 7 rotatably disposed therein, a grating 4 and an electric motor 5 for driving blade assembly 7. Each cutting device 3 also comprises a discharge 8 which is shown in the partially cut-away schematic view of FIG. 3. Discharge 8 is shown in the figures as a discharge which discharges substantially cut plant parts horizontally. It is however likewise possible to configure discharge 8 so that the cut plant parts are discharged downward.

Cutting device 3 is connected by an upright 9 to a girder 10 of frame 1. Uprights 9 are each connected to an adjusting arm 11. The girders 10 which are disposed in parallel are mutually connected by transverse connections 12. Upright 9 is rotatably attached to girder 10 by means of hinge 13. Upright 9 is in turn rotatably attached to adjusting arm 11 by means of hinge 14. Provided at the end of adjusting arm 11 is a structure 15 which enables engagement on transverse connection 12. An angular adjustment of cutting device 3 relative to support surface 2 can hereby be achieved.

FIG. 1 also shows adjusting elements 16 in the form of height-adjustable support elements. The whole frame can hereby be placed at an angle relative to a ground surface, and a determined angle between support surface 2 and the ground surface can thus be achieved. Such a setting of support surface 2 is also possible when this surface is connected to grating 4, preferably on both sides of support surface 2. Attaching grating 4 rotatably to housing 6 for rotation along a rotation axis perpendicular to grating 4 enables the height of the point where support surface 2 is connected to grating 4 to be set and the desired angle to be set.

Cutting device 3 also comprises a discharge 8 for discharging leaves which have been pulled and/or cut off. Discharge 8 can optionally be connected to a disposal bag.

Figure 3:
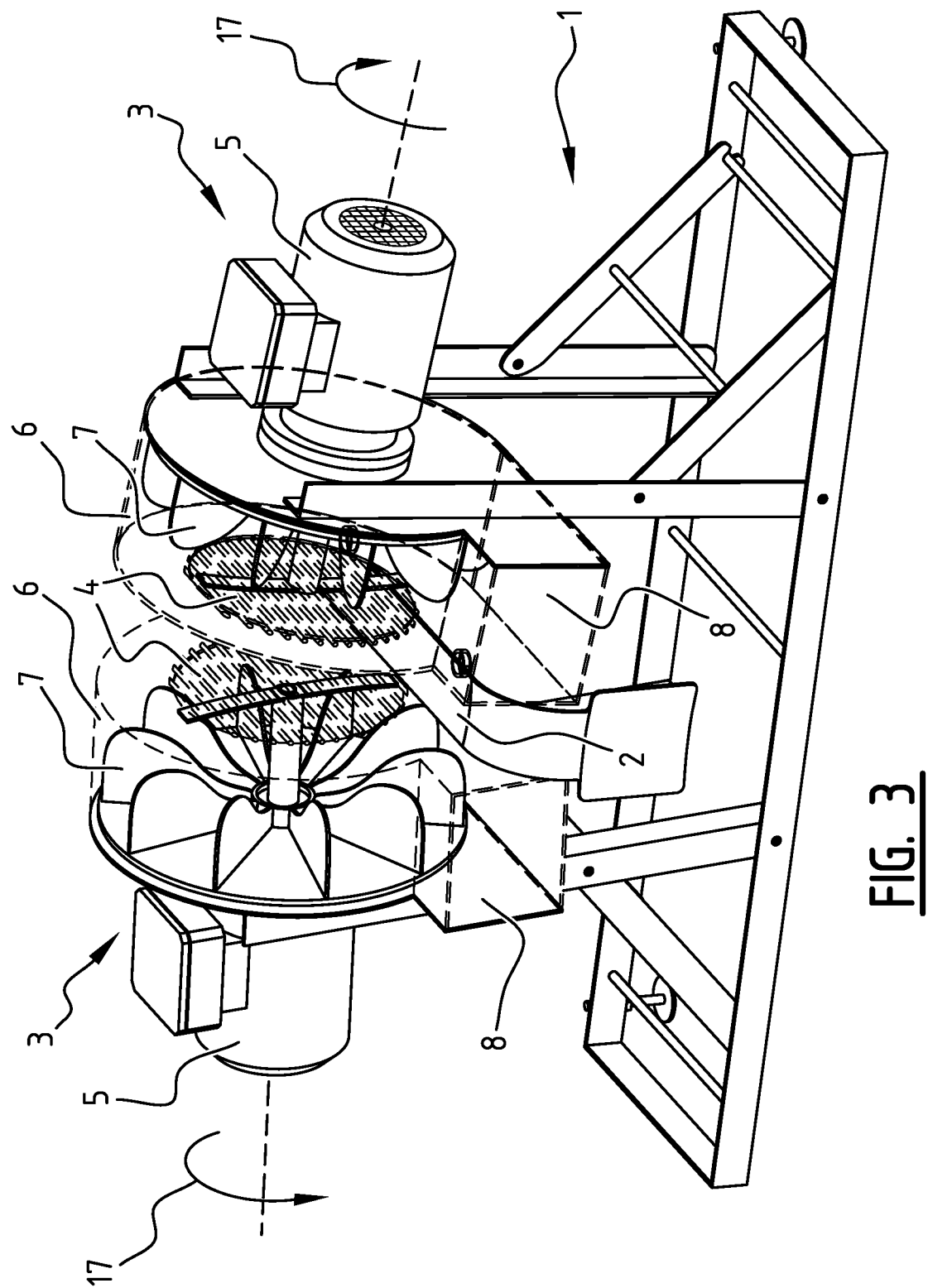
FIG. 3 shows a partially cut-away schematic view of the embodiment of FIG. 1.

Arrows 17 in FIG. 3 indicate possible rotation directions of blade assembly 7. It is noted here that it is preferred to have the two blade assemblies 7 rotate in opposite rotation directions, as shown.

Figure 4:
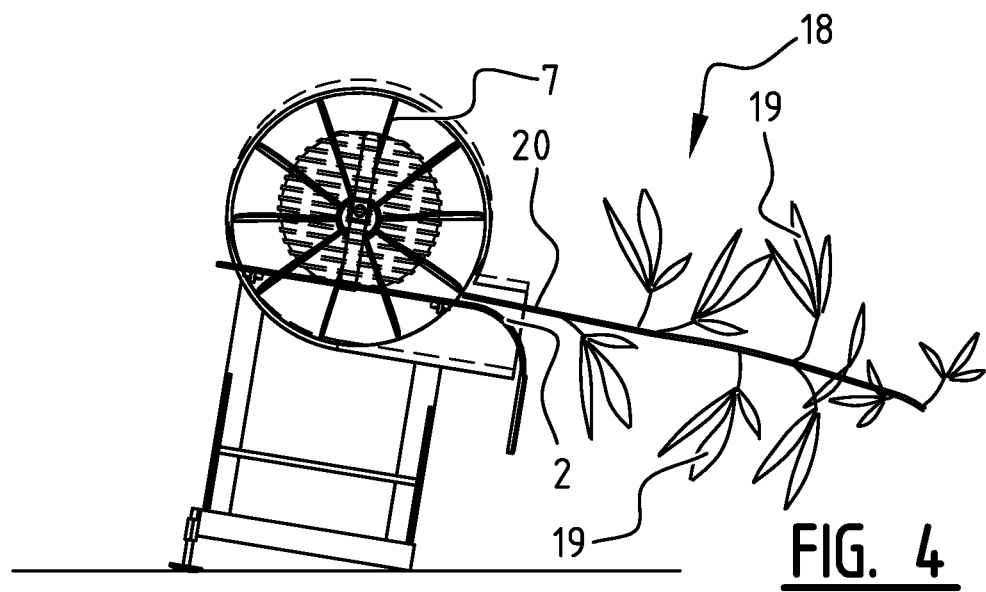
FIGS. 4-6 show the removal of leaves with the embodiment of FIG. 1.
Figure 5:
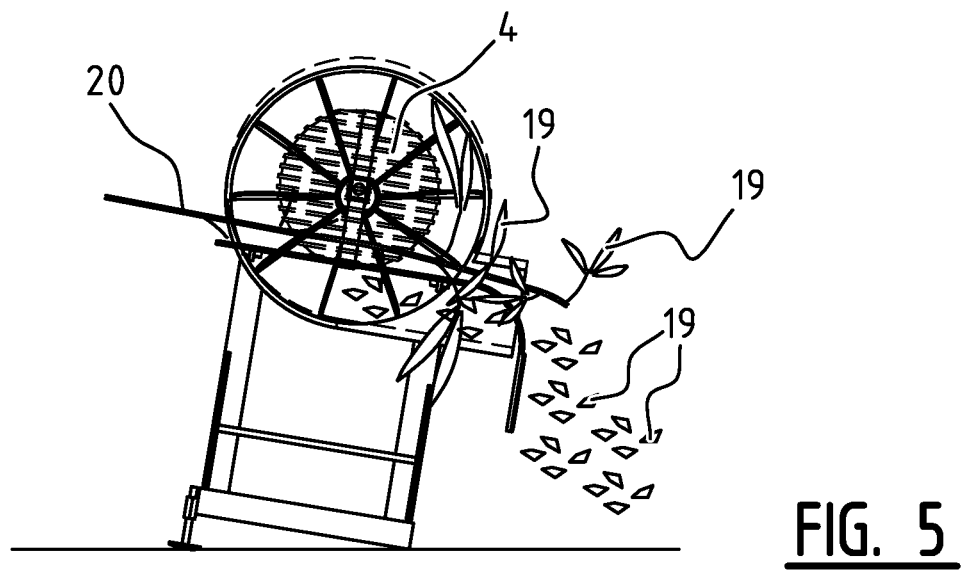
Figure 6:
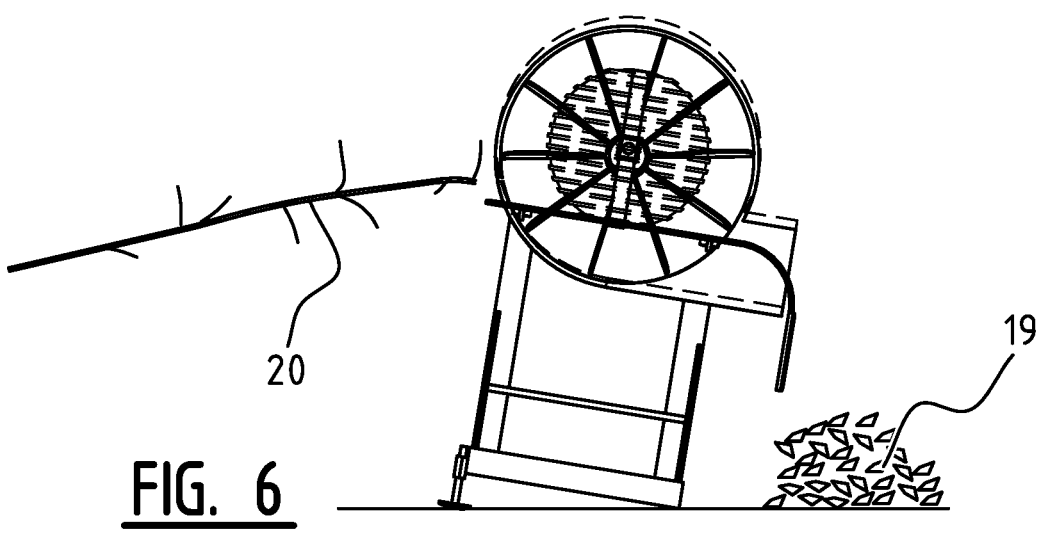

FIGS. 4-6 show how the device of FIG. 1 can be used for the removal of leaves.

As a first step, the device can be set. The setting can comprise of adjusting the height of adjusting elements 16, modifying the angle between cutting device 3 and support surface 2, and modifying the distance between cutting devices 3 in a direction perpendicularly of support surface 2. Frame 1 can be provided for this purpose with slide guides in which uprights 9 can for instance slide (not shown). If desired, it is further possible to opt for a different support surface 2. If the distance between cutting devices 3 is increased, it is possible to opt for a wider support surface 2, for instance by placing a wider plate part. It is thus preferred to attach support surface 2 releasably to frame 1. The setting referred to here is in accordance with the size, width and length of the plant.

FIGS. 4-6 show the operation of the device of FIG. 1. The user here stands on the side of the device which corresponds to the high part of support surface 2.

As a first step, the user places a plant 18 on support surface 2 with the top downward, as shown in FIG. 4. The drive of blade assemblies 7 will then be started. It is however also possible that these were already being driven during the placing of plant 18.

FIG. 5 shows that plant 18 is pulled upward along support surface 2. Because leaves 19 of plant 18 protrude through gratings 4 during this movement, leaves 19 are pulled off or leaves 19 are cut off stem 20. Because blade assemblies 7 have opposite rotation directions, a turbulent airflow is caused which will move leaves 19. More leaves 19 will hereby come into contact with blade assemblies 7. It is however also possible for the user to perform a rotating movement while pulling plant 18 upward, whereby plant 18 will rotate about its longitudinal axis. This also increases the chance of a leaf 19 being removed. It is also possible for the user to move plant 18 upward and downward in the longitudinal direction of support surface 2 in the case that an insufficient number of leaves 19 has been removed.

The final situation in FIG. 6 shows how leaves 19 have been removed from stem 20.

Described above is how leaves can be removed from a stem. The invention is however not limited thereto. This is because leaves can also grow on the fruit or flowers of a plant. A plant can further comprise different types of leaf depending on the location where the leaves grow. The invention can be applied in all these cases.

Nor is the invention limited to manually feeding or pulling the plant. An automated device, such as a robot arm, can be employed to place the plants and/or pull them along the support surfaces.

FIGS. 4-6 show the leaves as waste product. The invention is however not limited thereto. The leaves can also be further processed by making use of the above mentioned disposal bags.

The shown embodiment has a relatively symmetrical construction in the sense that use is made of two girders, two cutting devices, two adjusting arms per cutting device and so on. It will be apparent to the skilled person that the invention is also or can also be applicable when use is made of only one of the above stated components, such as a single cutting device.

Figure 7A:
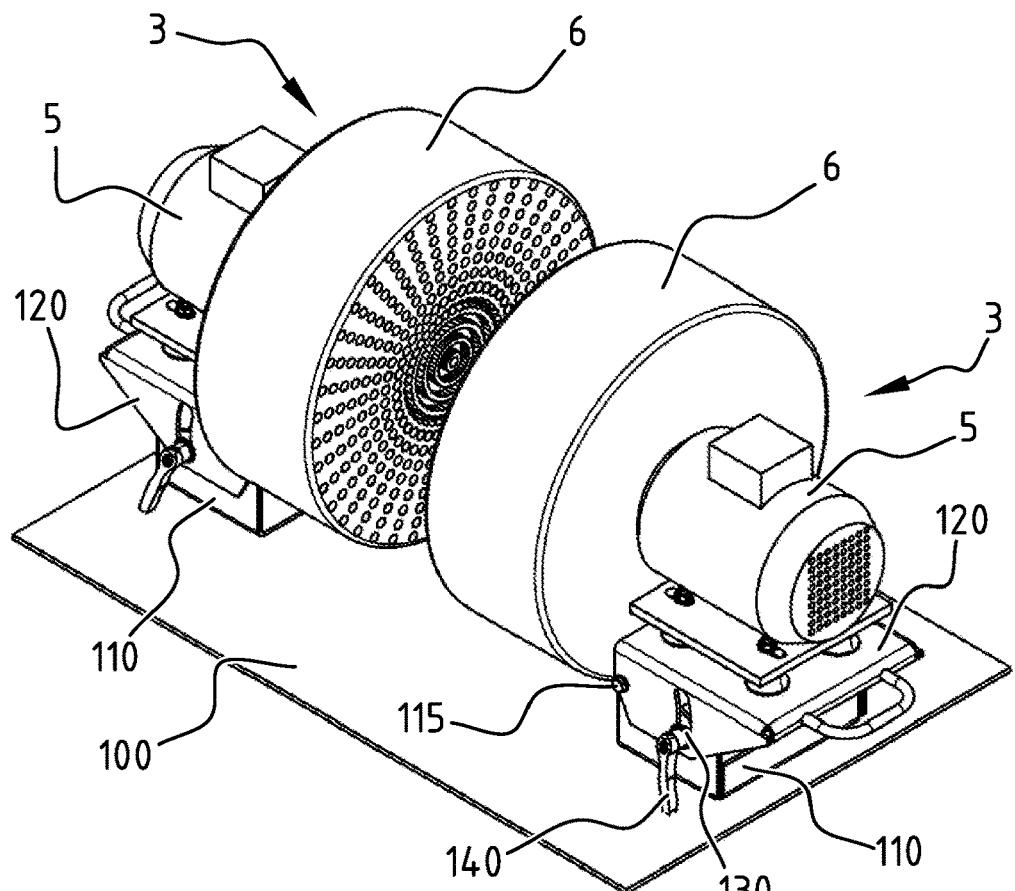
FIGS. 7A and 7B show respectively a schematic view and side view of an alternative of the embodiment of FIG. 1.
Figure 7B:
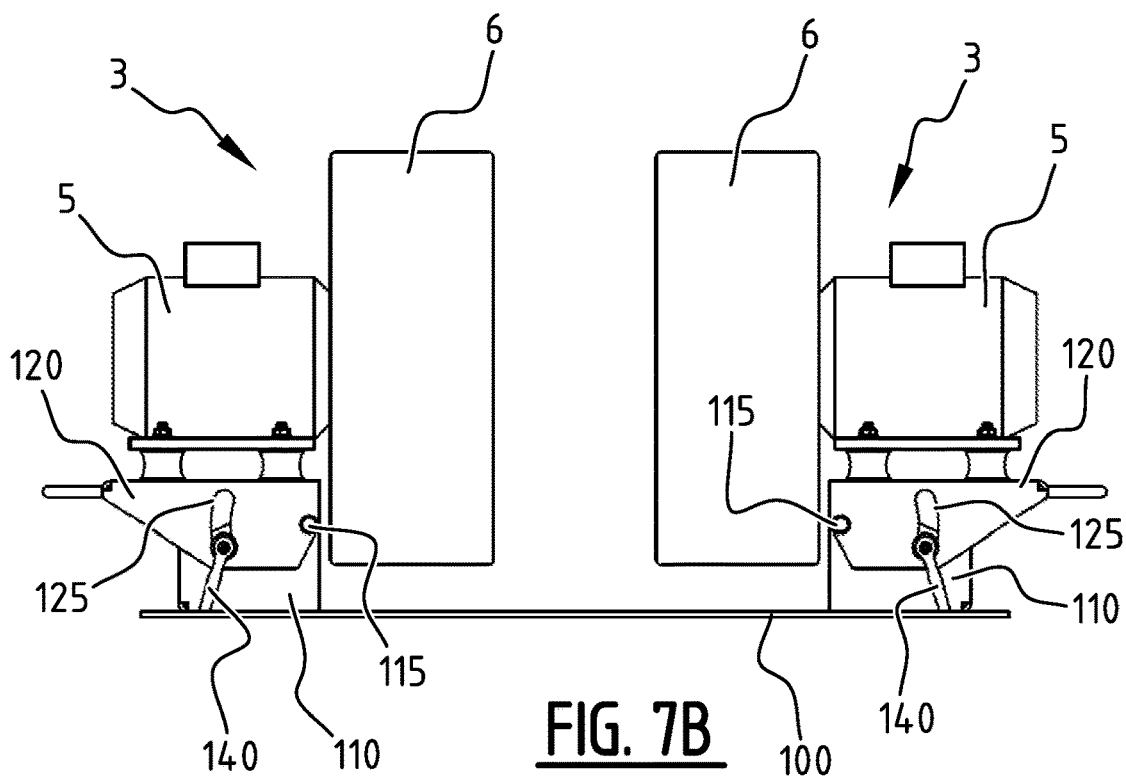

FIGS. 7A and 7B show respectively a schematic view and side view of an alternative of the embodiment of FIG. 1. This embodiment comprises a support table 100 which can be coupled to uprights (not shown) for placing on a ground surface, such as the floor. A pair of cutting device supports 110 is fixedly connected to table 100. Each cutting device 3 comprises a bracket 120 which is pivotally coupled to cutting device support 110 by means of a hinge 115 for the purpose of setting the second angle. Each bracket 120 comprises a slot 125 at a distance from hinge 115. Each cutting device support 110 further comprises a pin 130 which protrudes through slot 125. Pin 130 can be locked relative to slot 125 by means of a locking element 140 for the purpose of fixing the second angle.

The scope of protection of the present invention is not limited to the embodiment shown here. Various modifications can be made without departing from the scope of protection as defined by the appended claims.

The invention claimed is:

1. A device for removing leaves from a plant, comprising:
   a downward extending and elongate support surface for supporting the plant;
   a pair of cutting devices disposed on either side of the support surface, wherein each cutting device comprises a rotatable blade assembly and a grating which is disposed between the blade assembly and the support surface;
   a frame on which are mounted the pair of cutting devices and the support surface, wherein the frame is configured to be placed on a ground surface;
   wherein each cutting device is configured to at least one of cut and pull the leaves of the plant which protrude at least partially through the grating from the remaining part of the plant.

2. The device according to claim 1, wherein a first angle between the support surface and the ground surface can be adjusted between 0 degrees and 90 degrees.

3. The device according to claim 2, wherein the support surface is mountable on the frame in an adjustable manner, wherein the frame is provided on at least one side thereof with adjusting elements with which the distance between the ground surface and a remaining part of the frame can be adjusted.

4. The device according to claim 2, wherein the support surface is connected to the grating and wherein the grating is rotatably attached for rotation around a rotation axis which is perpendicular to the grating.

5. The device according to claim 1, wherein the cutting devices are mounted on the frame in an adjustable manner such that a second angle between a grating of one of the cutting devices and the support surface can be set.

6. The device according to claim 5, wherein the second angle can be adjusted between 10 and 170 degrees.

7. The device according to claim 5, wherein the frame comprises a support frame or table and a plurality of uprights which are connected to the support frame or the table.

8. The device according to claim 7, further comprising a pair of cutting device supports which are fixedly connected to the support frame or the table, wherein each cutting device is pivotally coupled by at least one hinge to a respective cutting device support for the purpose of setting the second angle.

9. The device according to claim 8, wherein for each cutting device:
   one of the cutting device support and the cutting device comprises a slot at a distance from the at least one hinge, and wherein the other of the cutting device support and the cutting device comprises a pin which protrudes through the slot; and
   the device further comprises for each cutting device a locking element for locking the pin relative to the slot for the purpose of fixing the second angle.

10. The device according to claim 5, wherein the frame comprises:
    a girder extending substantially parallel to the ground surface; and
    a pair of uprights rotatably connected to the girder, which uprights are each fixedly connected to a different cutting device.

11. The device according to claim 10, wherein the frame comprises a pair of said girders which are disposed in parallel and at a mutual distance, and wherein the frame further comprises a plurality of transverse connections between the pair of girders which are placed at a mutual distance, wherein at least one of each cutting device and the upright connected thereto, is rotatably connected to an adjusting arm, which adjusting arm can in each case engage at an end remote from the cutting device one of the plurality of transverse connections for the purpose of realizing a setting of the second angle.

12. The device according to claim 1, wherein a distance between the cutting devices can be adjusted in a direction substantially perpendicularly of to the support surface.

13. The device according to claim 12, wherein the frame comprises guides which extend in a direction substantially perpendicular to the support surface and in which at least one cutting device is slidably received.

14. The device according to any of the foregoing claims, wherein each cutting device further comprises:
   a housing in which the blade assembly is rotatably disposed;
   a motor for rotating the blade assembly; and
   a discharge for discharging leaves, which have been at least one of pulled and cut off, from the housing and to the outside.

15. The device according to claim 14, further comprising a control circuit for controlling the motors of the cutting devices, wherein the control circuit is configured to control the blade assemblies of the pair of cutting devices such that they have opposite rotation directions as seen from the support surface.

16. A method for removing leaves from a plant, comprising the steps of:
   providing a device for removing leaves from a plant according to claim 1;
   a user taking hold of an underside of the plant;
   placing the plant on the support surface with a top of the plant directed downward; and
   moving the plant along the cutting devices for the purpose of removing the leaves.

17. The method according to claim 16, wherein moving the plant along the cutting devices comprises pulling the plant toward the user.

18. The method according to claim 17, wherein moving the plant along the cutting devices comprises rotating the plant simultaneously to pulling the plant toward the user.

19. The method according to claim 16, wherein moving the plant along the cutting devices comprises moving the plant upward and downward in a longitudinal direction of the support surface.

20. The method according to claim 16, wherein the plant is placed on the support surface prior to removal of the leaves such that the cutting devices are situated between the user and a majority of the leaves of the plant.

* * * * *